United States Patent [19]

Rizzi

[11] Patent Number: 5,022,841
[45] Date of Patent: Jun. 11, 1991

[54] CHAIN DIE ASSEMBLY FOR MAKING HARD AND STUFFED SUGAR DROPS

[76] Inventor: Francesco Rizzi, Via Trieste, 62, 24057 Martinengo (Bergamo), Italy

[21] Appl. No.: 443,938

[22] Filed: Nov. 30, 1989

[51] Int. Cl.$^5$ .............................................. A23G 3/12
[52] U.S. Cl. .................................. 425/235; 425/296; 425/306; 425/308; 425/312; 425/390; 425/395; 425/408
[58] Field of Search ................ 425/233, 235, 297, 306, 425/307, 308, 312, 315, 390, 392, 395, 398, 296, 408, 345, 236, 344; 426/516, 512, 517; 72/190

[56] References Cited

U.S. PATENT DOCUMENTS

| | | | |
|---|---|---|---|
| 1,348,081 | 7/1920 | Brach | 425/236 |
| 2,157,467 | 5/1939 | Thürlings | 425/235 |
| 3,269,088 | 8/1966 | Kath | 425/235 |
| 4,264,292 | 4/1981 | Pisoni | 425/236 |

Primary Examiner—Willard E. Hoag
Attorney, Agent, or Firm—Bucknam and Archer

[57] ABSTRACT

The die essentially comprises a top chain and a bottom chain entrained between horizontal parallel axis gear wheels and having corresponding sliding portions contacting one another.

The top chain defines at a central position, by inner and outer links thereof, substantially dihedral structures, forming open seats therealong can slide the two portions of a sugar drop forming die.

The bottom chain, in turn, defines like dihedral structures the corner portions of which are adapted to cut a sugar bead, means being moreover provided for clamping the two portions of the die.

10 Claims, 7 Drawing Sheets

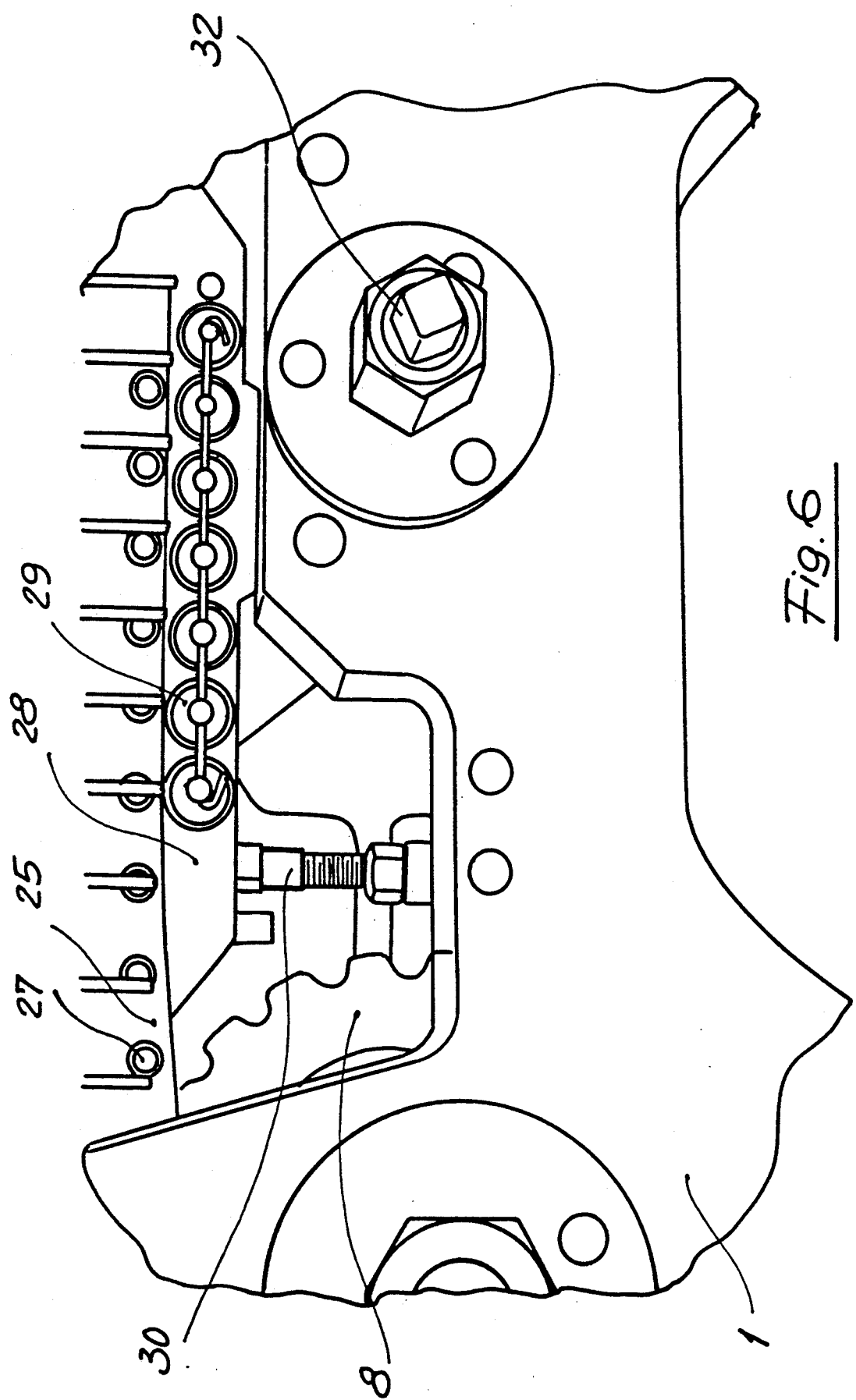

CHAIN DIE ASSEMBLY FOR MAKING HARD AND STUFFED SUGAR DROPS

BACKGROUND OF THE INVENTION

The present invention relates to an improved die for making hard and stuffed sugar drops in general.

As is known hard and stuffed sugar drops are conventionally made by means of suitable making apparatus in which a plurality of rotary hollow punch pairs is provided for forming the single sugar drops.

More specifically, these hollow punch pairs, which can be moved toward one another, are mounted on a top chain therewith there is tangentially engaged a bottom chain which supports corresponding cutting members.

Also known is the fact that these conventional sugar drop making machines are affected by several drawbacks, mainly occurring in adjusting the tension of the two chains, which negatively affects the obtained sugar drops.

These conventional sugar drop machine machines, moreover have a comparatively low making yield.

SUMMARY OF THE INVENTION

Accordingly, the task of the present invention is to overcome the above mentioned drawbacks, by providing an improved chain die assembly, for making hard or solid and stuffed sugar drops, which, the rotary speed of the chains being the same, has a very high production rate.

Within the scope of this task, a main object of the present invention is to provide such an improved chain die assembly which is able of making perfectly even and finished sugar drops.

Another object of the present invention is to provide such an improved chain die assembly which is very reliable in operation.

According to one aspect of the present invention, the above mentioned task and objects, as well as yet other objects, which will become more apparent hereinafter, are achieved by an improved chain die assembly for making hard or solid and stuffed sugar drops, characterized in that said die assembly essentially comprises a top chain and a bottom chain, entrained on horizontal parallel axis gear wheels and having contacting sliding corresponding portions, said top chain supporting, at a central position thereof, essentially dihedral structures defining open seats therealong are able of sliding the two portions of a sugar drop forming die assembly, said bottom chain defining in turn a plurality of like dihedral structures the corner portions of which are adapted to cut the sugar drop forming sugar bead, means being moreover provided for clamping the two portions of the die assembly and cutting said sugar bead.

BRIEF DESCRIPTION OF THE DRAWINGS

Further characteristics and advantages of the improved chain die assembly for making sugar drops according to the present invention will become more apparent from the following detailed description of a preferred embodiment thereof, which is illustrated, by way of an indicative but not limitative example in the figures of the accompanying drawings, in which:

FIGS. 6 and 7 illustrate a cam member acting on the top span of the bottom chain, for cutting the sugar bead;

DESCRIPTION OF THE PREFERRED EMBODIMENT

Figure 1:
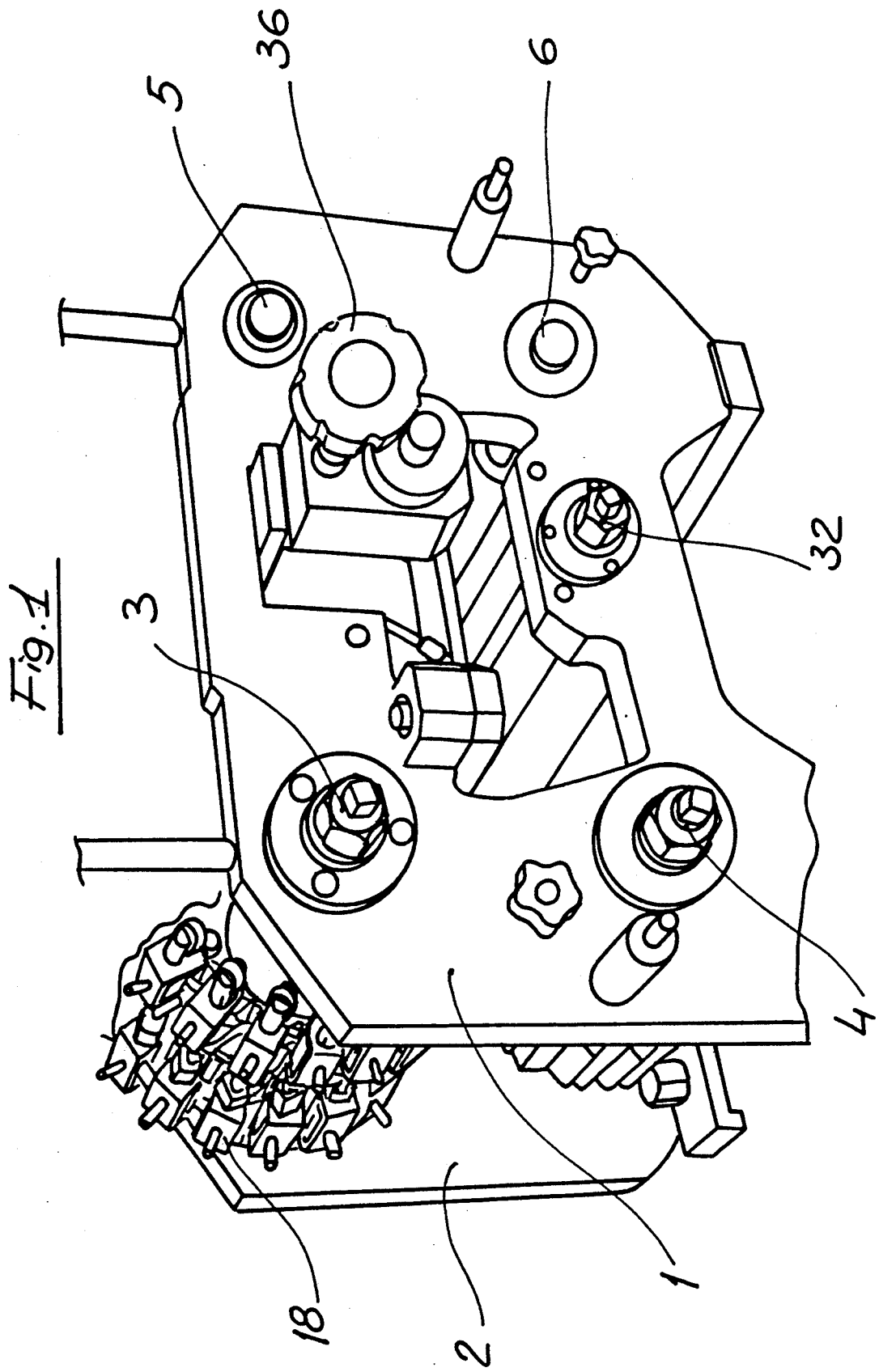
FIG. 1 is a schematic front perspective view illustrating the sugar drop forming die assembly according to the invention.
Figure 2:
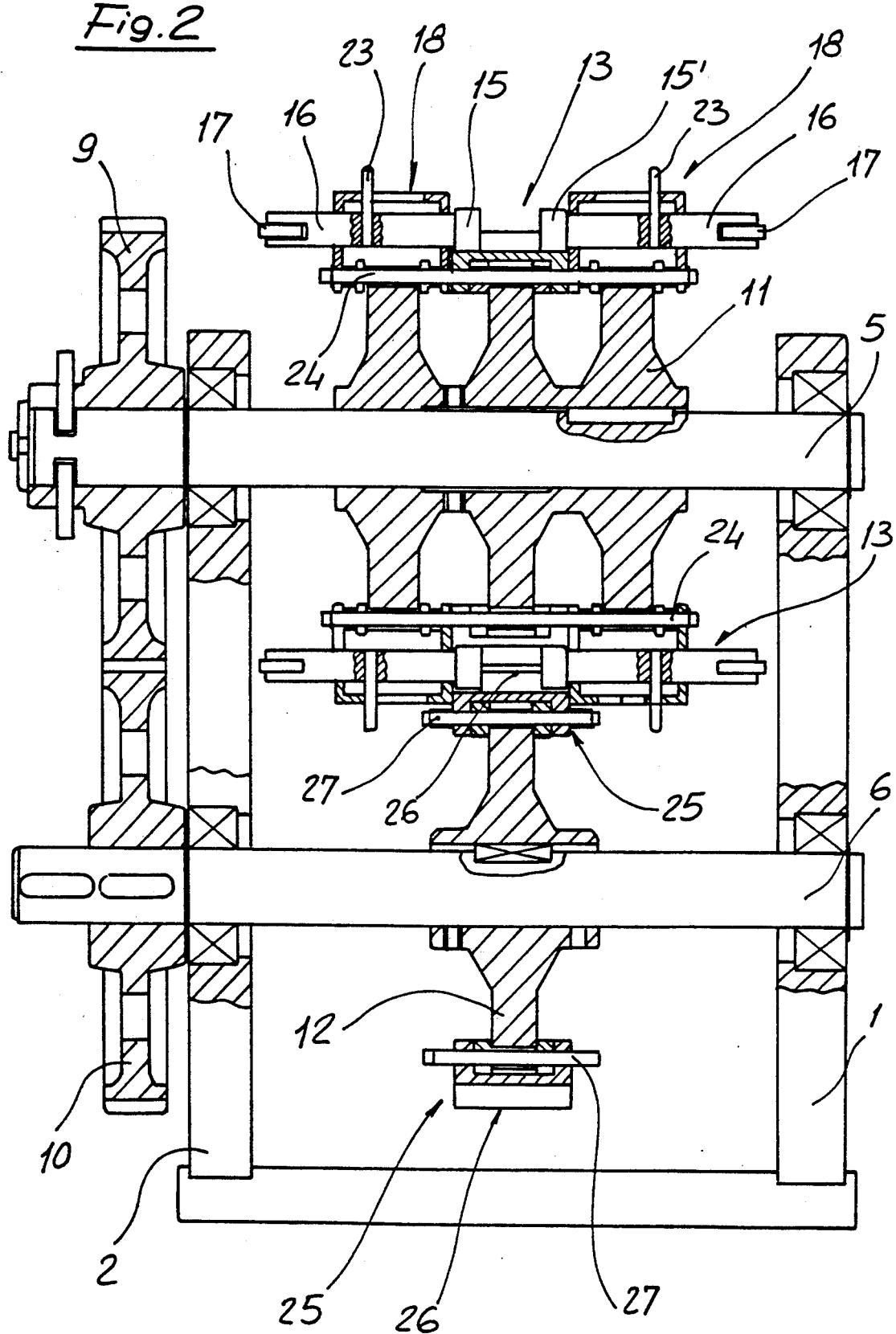
FIG. 2 is a cross sectional view of this die assembly, taken at the output shafts.
Figure 3:
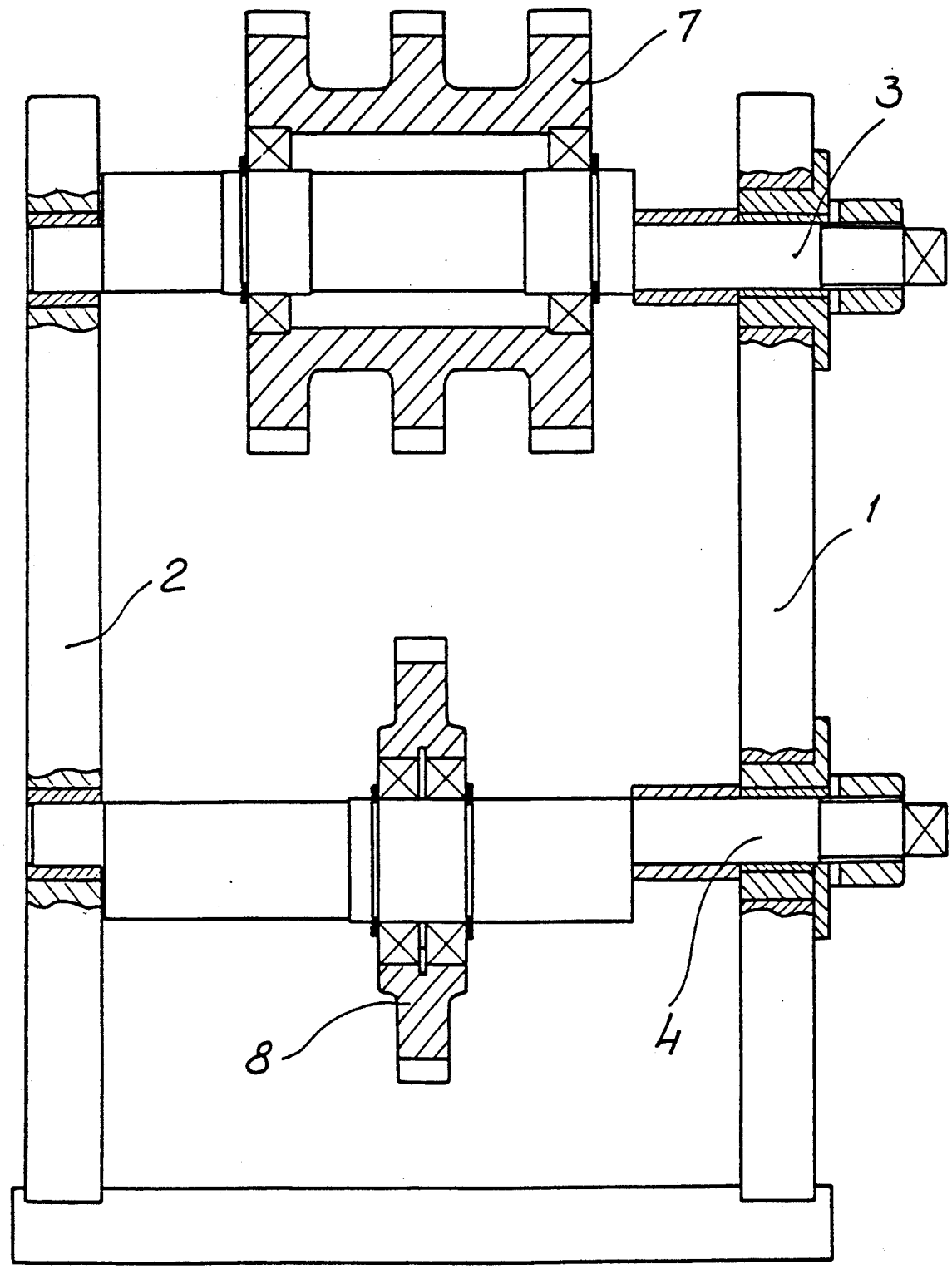
FIG. 3 is another cross-sectional view of the subject die assembly substantially taken at the inlet shafts or axes.
Figure 4:
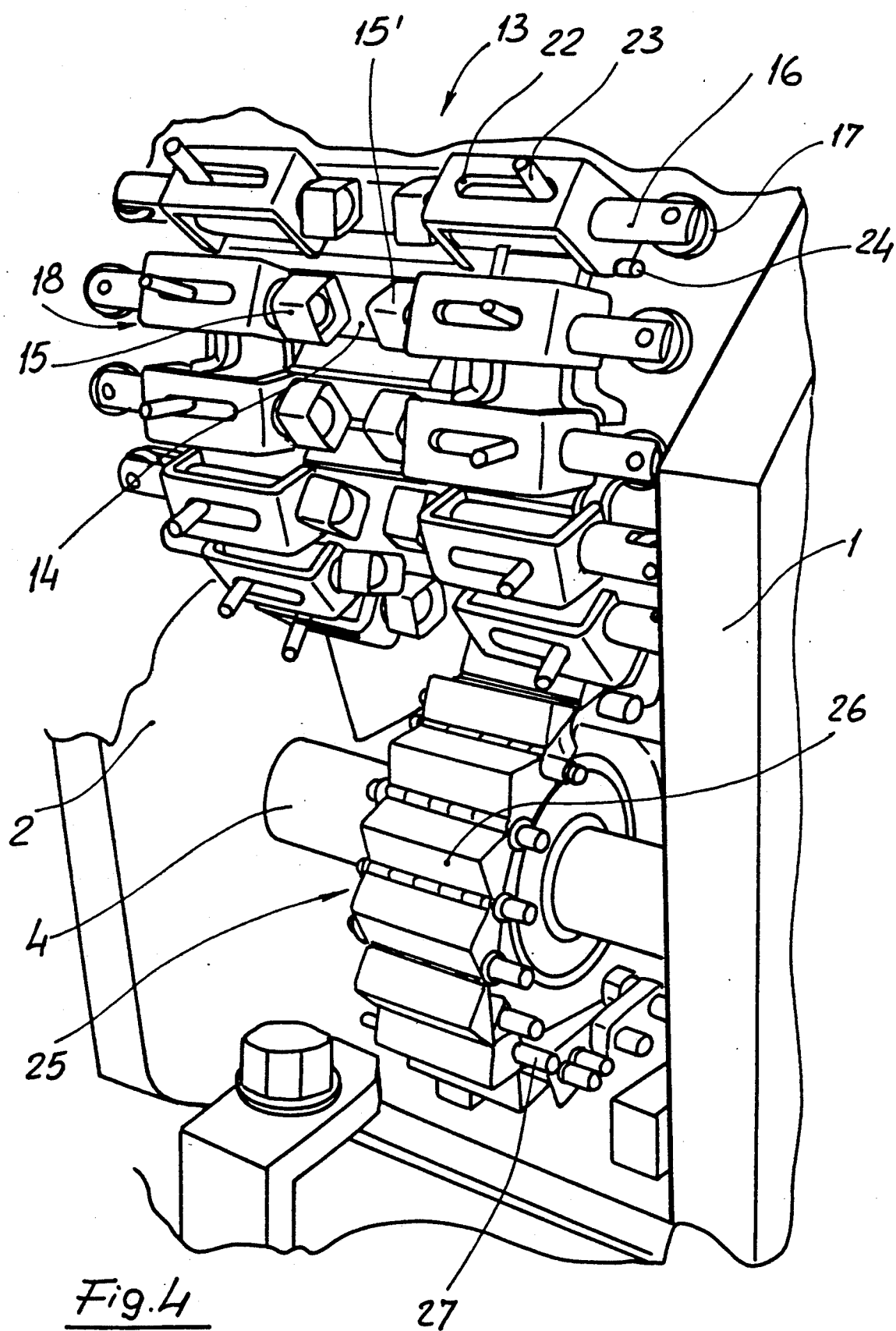
FIG. 4 is a side perspective view, in a partially broken away form, illustrating the subject die assembly.
Figure 5:
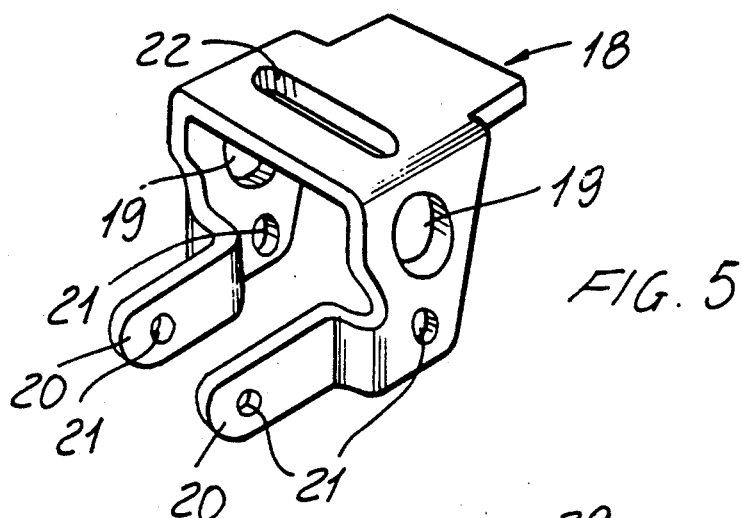
FIG. 5 illustrates a supporting member pivotably coupled to the two sides of the links of the top chain and to which the die half portions are coupled.
Figure 8:
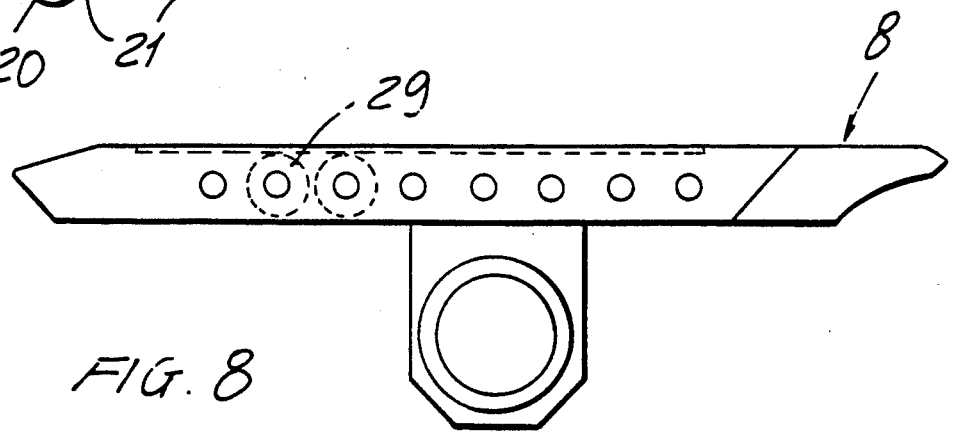
FIG. 8 shows the profile of contour of the cam member.
Figure 10:
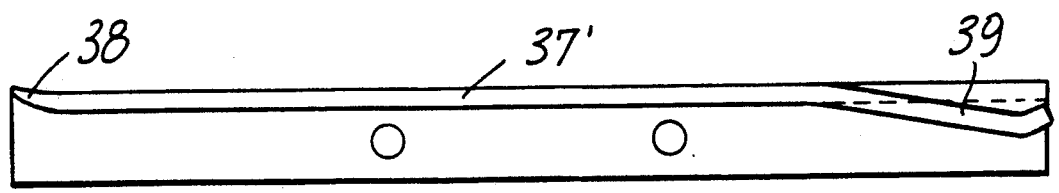
FIG. 10 shows one of the two cams for moving away the half portions of the die after the formation of a sugar drop.
Figure 9:
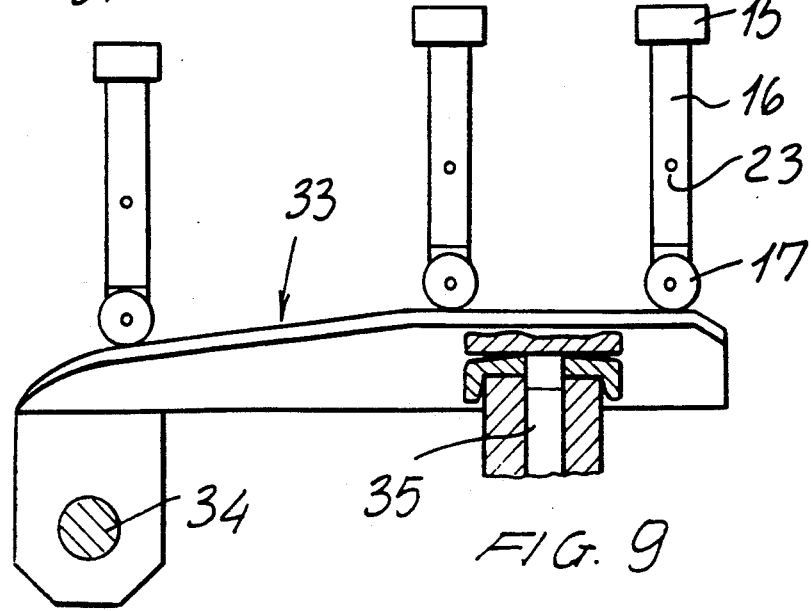
FIG. 9 schematically shows one of the cams for clamping the cooperating half die portion pairs.
Figure 7:
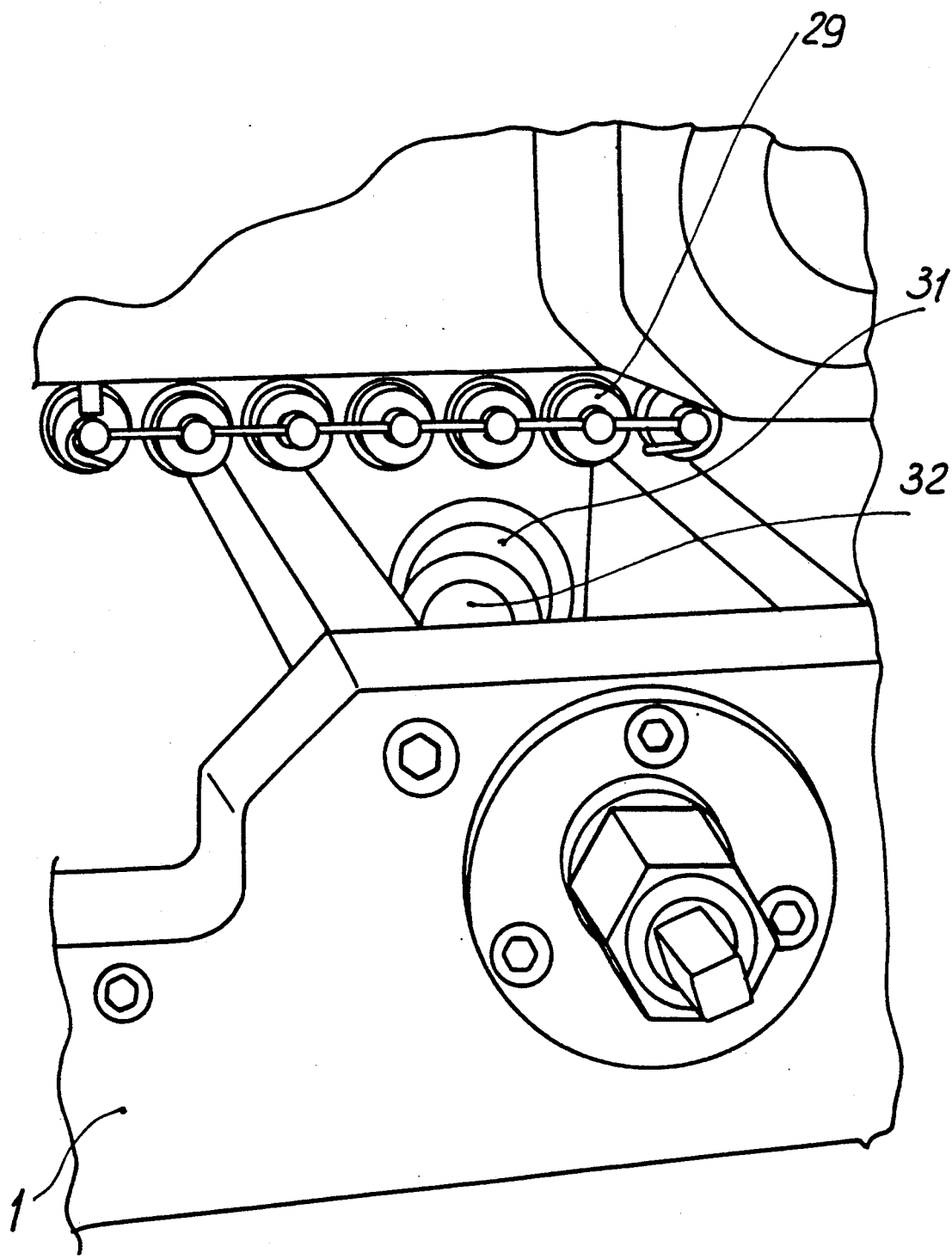

With reference to the figures of the accompanying drawings, the improved chain die assembly for making sugar drops according to the present invention comprises an assemblable frame consisting of two shaped shoulders, respectively a front shoulder 1 and a rear shoulder 2, which supports, at one end thereof, two parallel axles 3 and 4, vertically extending, and, at the other end portions thereof, two small shafts or spindles 5 and 6 with the same arrangement as the axles.

On said axles, which are eccentrically arranged with respect to their supports, are idly mounted corresponding gear wheels, respectively of the three ring gear type 7 and one ring gear type 8.

On the shafts 5 and 6, which are coupled to one another by means of the gear members 9 and 10, one of which is a driven gear, the corresponding gear wheels 11 and 12 are rigid with said shafts.

In this connection it should be pointed out that the position of the top gear wheel 11, or driving gear wheel, on its shaft, can be suitably changed or adjusted, by mutually coupling the parts by means of pressing screws, for example, or the like operatively equivalent means.

Between the mentioned top gear wheels there is entrained a first chain, indicated overally at the reference number 13, which consists of a plurality of outer and inner links, of substantially known type, which are mutually coupled and define, by pairs, dihedral seats 14 therealong are able of sliding the two cooperating portions 15 and 15' of corresponding hollow dies.

These dies are mounted at one end of a respective rod 16, at the other end portion of which there is pivoted a small wheel 17.

Each rod is slidingly coupled to a small supporting member, indicated overally at the reference number 18, of substantially reversed bracket shape and provided at the two sides thereof, with holes 19 therethrough said rod is caused to pass.

Said supporting member is moreover provided with two bottom lugs 20 which extend perpendicularly to the sides of said supporting member, with a double bend, so that their end portions are arranged inside the mentioned sides.

At said end portions and the bottom portion of these sides, there are formed hole pairs 21, whereas on the top wall of the supporting member 18 there is formed a cross slot 22.

In this slot 22 there is engaged a pin 23 which is radially formed of the rod supporting the half die and is adapted to restrain the stroke of the latter in the two directions.

In this connection it should be pointed out that the small supporting members are arranged, by pairs, on the two sides of the links of the chain 13 and that they are mutually pivotably coupled to one another by means of pins 24.

On the bottom gear wheels 8 and 12 there is entrained a second chain 25 also consisting of inner and outer links defining operatively dihedral corners 26 and articulated by means of pins 27.

As these dihedral corners contact the corresponding corners of the first chain, or top chain, they will cut the cooked sugar bead or cord.

This cutting operation, in particular, will be facilitated by the provision of suitable bilateral pressing cams 28 which are mounted on tight or sealed ball bearings 29 to reduce to a minimum the operating friction.

More specifically, these cams are articulated at a respective end portion thereof on uprights consisting of threaded stems 30 and can be upwardly pushed by an eccentric mechanism 31 which can be actuated by an operator through an outer handwheel (not specifically shown) which is mounted at one end of the shaft or spindle 32.

Further bilateral or two-side cams 33 are provided, adapted to engage with the small wheels of the rods 16 in order to cause the half dies to move by pressure to one another in order to form subsequent sugar bead lengths.

For adjusting the stroke of the mentioned rods, depending on the thickness of the sugar drops to be made, said cams, or forming cams, are pivoted at one end thereof to a vertical pivot pin 34 and are suitably inwardly displaced, in a timed manner, by means of a threaded spindle 35 which can be actuated by the operator through a handwheel 36.

As shown, downstream of the mentioned forming cams there are provided bilateral removing cams 37 which are arranged, as the above mentioned cams, inside the shoulders 1 and 2 for moving away from one another the two half dies 15 and 15'.

This withdrawing cams substantially consist of an angle element the vertical leg 37' of which is provided with a starting lead in portion 38 and an outward diverging portion 39 adapted to recover the rod pairs to their starting positions.

From the above disclosure it should be apparent that the invention fully achieves the intended task and objects.

While the invention has been disclosed and illustrated with reference to a preferred embodiment thereof, it should be apparent that the disclosed embodiment is susceptible to several modifications and variations all of which will come within the spirit and scope of the appended claims.

What is claimed is:

1. A chain die assembly for making hard and stuffed sugar drops comprising a top chain and a bottom chain, entrained on horizontal parallel axis gear wheels and having contacting sliding corresponding portions, said top chain supporting, at a central portion thereof, essentially dihedral structures defining open seats therealong which are capable of sliding two dies of a sugar drop forming die assembly, said bottom chain defining in turn a plurality of like dihedral structures having corner portions adapted to cut a sugar drop forming sugar bead, means being moreover provided for clamping said two dies of said die assembly and cutting said sugar bead.

2. A die assembly according to claim 1, wherein said bottom chain comprises inner and outer links pivotally coupled by pins and defining dihedral cutting corners.

3. A die assembly according to claim 1, wherein said assembly further comprises pressing cams mounted on sealed ball bearings and adapted to facilitate the sugar bead cutting, said cams being pivotally coupled, at one thereof, on uprights including threaded stems and adapted to be upwardly pushed by an eccentric mechanism which can be actuated by an operator through an outer handwheel.

4. A die assembly according to claim 1, wherein said assembly further comprises a frame including two shoulders supporting, at one end thereof, two vertical parallel axles and, at the opposite end thereof, two vertical parallel shafts.

5. A die assembly according to claim 4, wherein on said axles there are idly mounted corresponding gear wheels, respectively of a three ring gear type and one ring gear type.

6. A die assembly according to claim 1, wherein said dies can be pressed toward one another by first two-side cams adapted to engage small wheels on said rods, said cams being pivoted on a vertical pivot pin and being inwardly displaced by a threaded spindle which can be operated by the operator through a handwheel.

7. A die assembly according to claim 6, wherein downsteam of said first two-side cams there are provided second two-side cams for moving apart said dies, said second two side cams including an angle element having a vertical leg provided with a starting lead-in portion and an outward diverging end portion.

8. A die assembly according to claim 1, wherein two portions of said dies, sliding on links of the top chain, are mounted at one respective end of a rod at the other end of which there is pivoted a small wheel, said rod being slidingly coupled to a U-shaped supporting member provided with holes for receiving said rod.

9. A die assembly according to claim 8, wherein said U-shaped supporting member is provided with two bottom lugs and hole pairs, said supporting member further including a top wall including a cross slot in which there is engaged a restraining pin adapted to bidirectionally restrain a stroke of said rods.

10. A die assembly according to claim 8, wherein said supporting members are arranged, by pairs, at two sides of links of the top chain and being pivotally coupled to one another.

* * * * *